Figure 1:
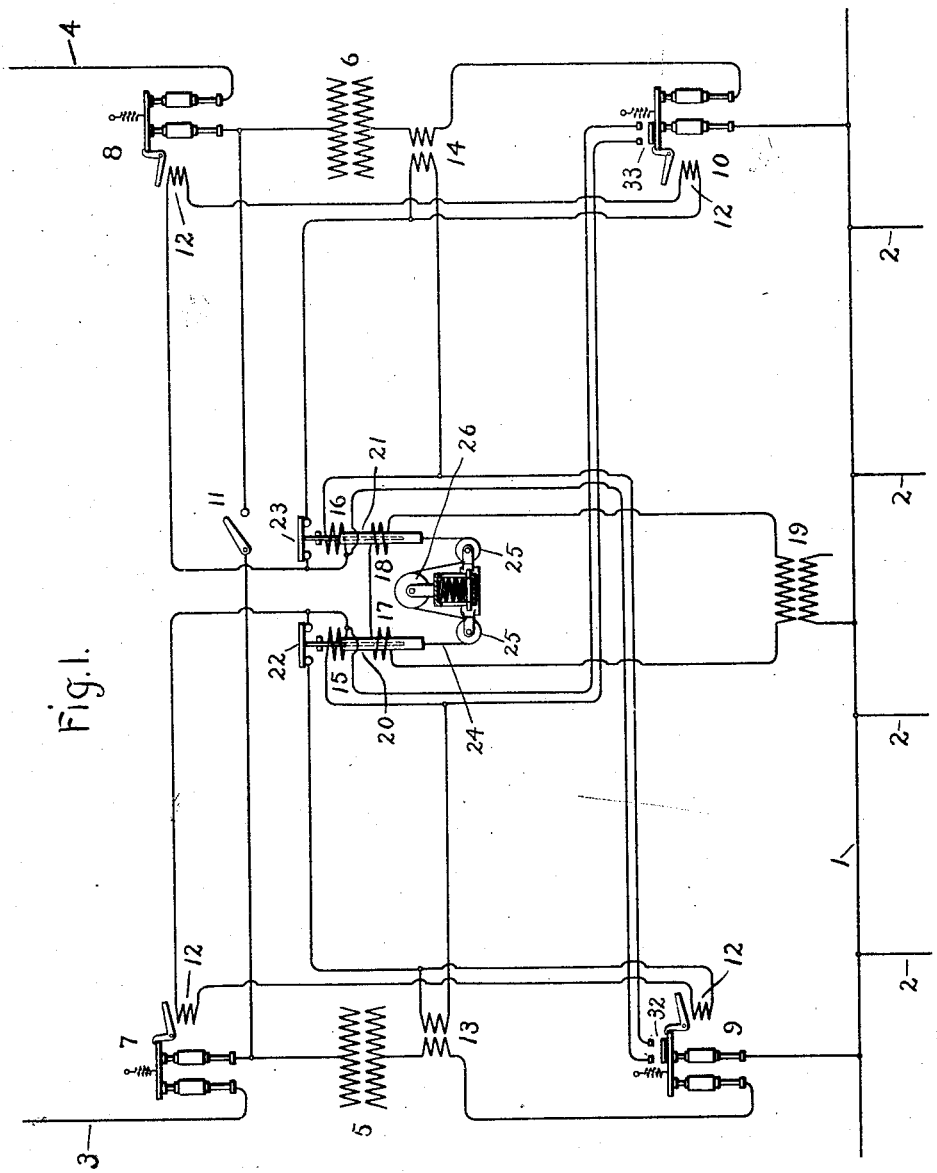

R. M. OSTERMANN.
PROTECTIVE DEVICE FOR DISTRIBUTION SYSTEMS.
APPLICATION FILED NOV. 2, 1908.

1,000,934.

Patented Aug. 15, 1911.
4 SHEETS—SHEET 1.

Witnesses
J. Earl Ryan
J. Ellis Glen

Inventor.
Rudolf M. Ostermann.
by
Atty.

R. M. OSTERMANN.
PROTECTIVE DEVICE FOR DISTRIBUTION SYSTEMS.
APPLICATION FILED NOV. 2, 1908.
1,000,934.
Patented Aug. 15, 1911.
4 SHEETS—SHEET 2.
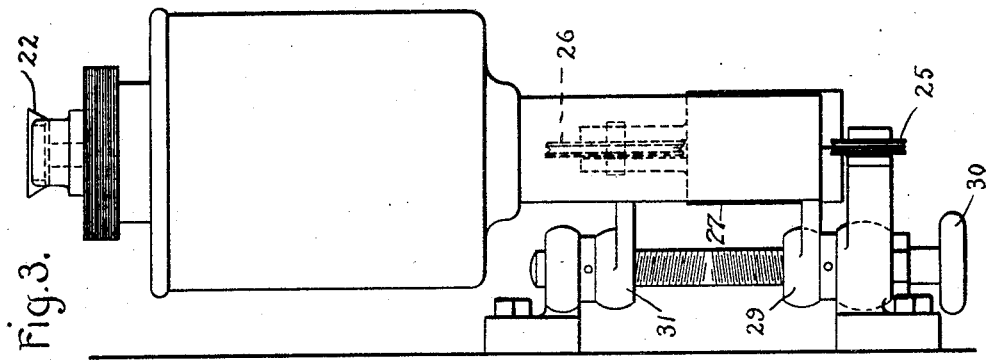
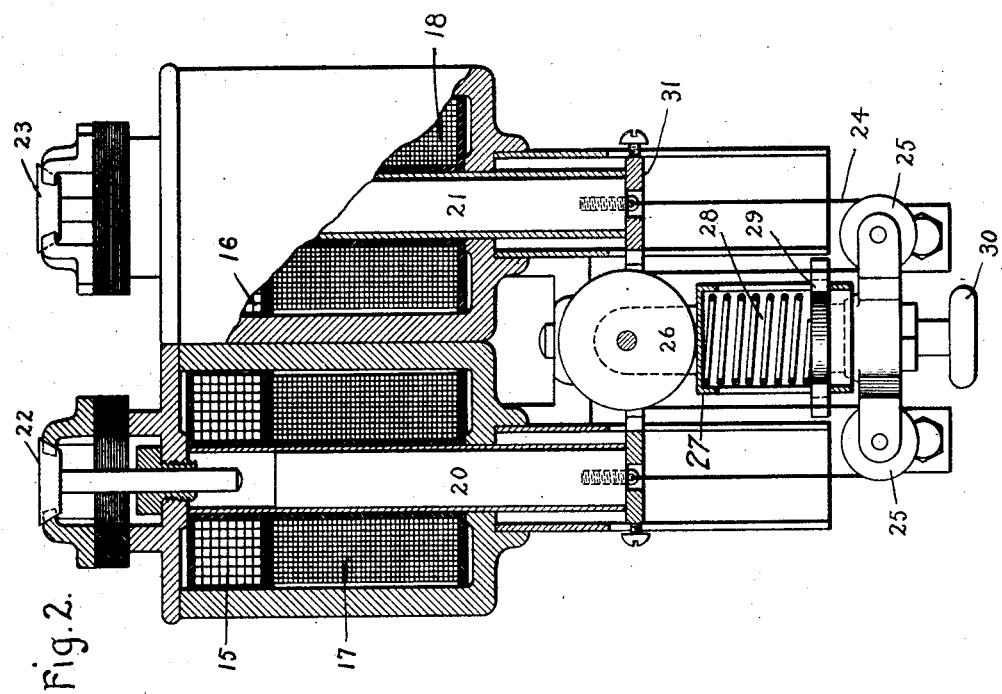

R. M. OSTERMANN.
PROTECTIVE DEVICE FOR DISTRIBUTION SYSTEMS.
APPLICATION FILED NOV. 2, 1908.
1,000,934.
Patented Aug. 15, 1911.
4 SHEETS—SHEET 4.
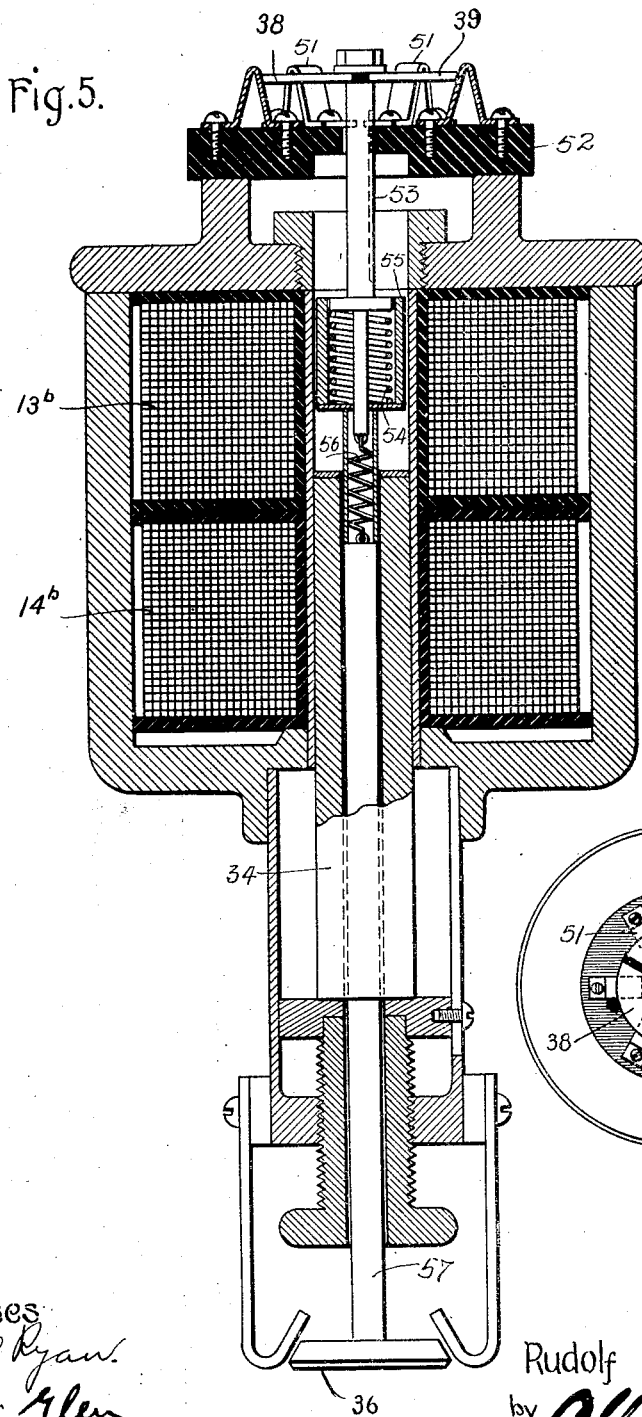
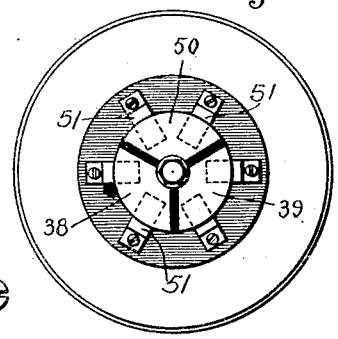
Witnesses
J. Earl Ryan.
J. Ellis Glen
Inventor
Rudolf M. Ostermann.
by Albert G. Davis
Atty.

UNITED STATES PATENT OFFICE.

RUDOLF M. OSTERMANN, OF BOGOTA, COLOMBIA, ASSIGNOR TO GENERAL ELECTRIC COMPANY, A CORPORATION OF NEW YORK.

PROTECTIVE DEVICE FOR DISTRIBUTION SYSTEMS.

1,000,934.  Specification of Letters Patent.  Patented Aug. 15, 1911.

Application filed November 2, 1908. Serial No. 460,795.

*To all whom it may concern:*

Be it known that I, RUDOLF M. OSTERMANN, a subject of the King of Prussia, residing at Bogota, United States of Colombia, South America, have invented certain new and useful Improvements in Protective Devices for Distribution Systems, of which the following is a specification.

My invention relates to protective devices for systems of electrical distribution and more particularly to systems in which parallel transmission lines are connected to the same bus bars of the substation or other distributing point.

It is customary in systems distributing large amounts of energy to use two or more parallel transmission lines between the generating station and the important substations in order to prevent interruption of the service by damage to one of the transmission lines. If a transmission line is damaged, it is disconnected from the system by automatic switches or circuit breakers, usually installed at each end of each transmission line and controlled by protective devices, commonly called reverse current relays, which are responsive to reversed energy flow and open the switches to prevent the damaged line drawing current from the system.

It has been found in practice that the reverse current relays commonly used operate not only on reverse energy flow but also on excessive flow of current in the normal direction. A short circuit on one of the transmission lines will reverse the direction of energy flow in that line and will cause the reverse current relay controlling that line to operate, but it is apt to cause in the other transmission lines a heavy rush of current which, although in the normal direction, will nevertheless operate the reverse current relays corresponding to the other lines, hence all the switches are opened and the service to the substation interrupted.

The object of my invention is to provide parallel transmission lines with protective devices which will in response to reverse energy flow due to damage to a transmission line select and cut out the damaged line and also prevent the healthy transmission lines being cut out by a heavy rush of current in the normal direction; to increase the sensitiveness and accuracy of the reverse current relays; and to interlock the protective devices and the automatic sectionalizing switches of the bus, thereby preventing a heavy rush of current through the bus opening the sectionalizing switches while the protective devices are in operation.

In carrying out my invention protective devices responsive to reverse energy flow are connected to each transmission line and are interlocked in such a manner that the damaged transmission line is automatically selected and cut out while at the same time the protective device becomes unable to cut out the healthy transmission line. This result is preferably accomplished by connecting reverse current relays to the same phases in each transmission line and interlocking the relays of each phase by means of an interlock arranged to permit that relay corresponding to the damaged transmission line to move into operative position and at the same time render the other relays inoperative and unable to respond to those heavy currents in a normal direction which have heretofore caused trouble by operating the relays.

The operating forces are small in reverse current relays as commonly constructed with opposed current and potential coils, since the potential coil is always energized and must not be strong enough to lift the core unaided, and, therefore, in accordance with my invention, the operating forces and the sensitiveness of the reverse current relays are both increased by means of an intensifying device or auxiliary relay which is in operation only during reverse energy flow on one of the transmission lines, and when operated connects the reverse current relays into circuit, thereby permitting the use of large currents in both coils of the reverse current relays, since the currents flow through the relays only for the short period of time required to bring the relays into action and to open the switches.

Where the busbars in the substation are sectionalized, it is desirable to prevent the sectionalizing switches being opened by the rush of current in the bus caused by a short circuit on a transmission line and my invention therefore contemplates means for automatically preventing the opening of the bus sectionalizing switches during reverse energy flow, and the preferred arrangement for securing this result is some form of device for rendering the sectionalizing switches non-automatic during the time the reverse current relays are in action, this device preferably being controlled by means of the auxiliary relay which brings the reverse current relays into action.

My invention will best be understood in connection with the accompanying drawings, which are merely illustrative of one of the many forms in which it may be embodied and in which—

Figure 4:
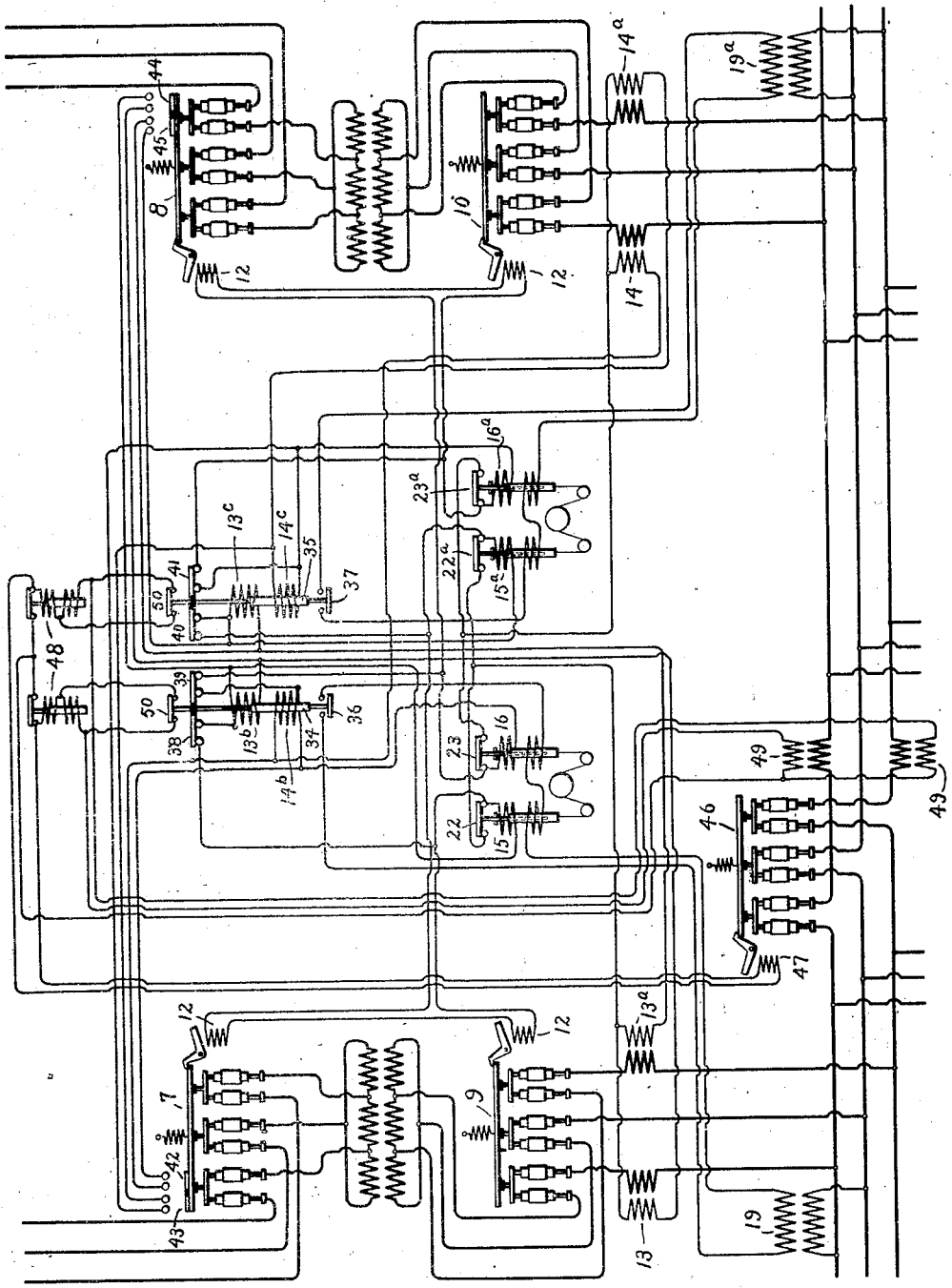

Figure 1 is a diagram showing a substation with two transmission lines controlled by interlocked reverse current relays; Fig. 2 is a sectional view of the relay showing details of the interlock; Fig. 3 is a side elevation showing the calibrating means; Fig. 4 is a diagram showing the wiring of a substation supplied by two three-phase transmission lines with an auxiliary device for bringing the reverse current relays into action and for simultaneously rendering the bus sectionalizing switch non-automatic; Fig. 5 is a cross-section of the auxiliary relay; and Fig. 6 is a plan view of the same showing the arrangements of contacts.

In the arrangement shown in Fig. 1, the transmission lines, bus bars, and feeders, which are usually polyphase, are represented by single lines to simplify the drawing. The bus bar 1 in the substation supplies the various feeders 2 and in turn is supplied from the two parallel transmission lines 3 and 4 through transformers 5 and 6. Each transformer may be disconnected from the transmission lines by means of automatic oil switches or circuit breakers 7 and 8 and also from the bus bars by means of similar automatic switches or circuit breakers 9 and 10.

In the arrangement shown in Fig. 1, the transformers are provided on the transmission line side with a connecting switch 11 to enable both transformers to be supplied from one transmission line if desired. The automatic switches or circuit breakers are provided with trip coils 12 energized from current transformers 13 and 14, preferably placed between the transformers and the bus bars to cause the protective device to act in case of a break down in the transformers as well as on the transmission lines. The supply of current from the current transformers to the trip coils of the switches is controlled by any suitable protective device or relay responsive to reverse energy flow. In the arrangement shown in the drawing, a reverse current relay is connected to each transmission line, these relays comprising current coils 15 and 16, connected to the two current transformers 13 and 14, and potential coils 17 and 18, energized from the potential transformers 19 connected to the bus bars. The current and potential coils of each reverse current relay coöperate and exert a combined effect upon the movable armatures or cores 20 and 21, which control the supply of current to the trip coils 12 by means of short circuiting switches 22 and 23 in the circuit of the trip coils. As shown in the drawing, the connections are such that under normal conditions the short-circuiting switches are closed and the entire current of the current transformers 13 and 14 flows through the current coils of the reverse current relays. As long as conditions are normal, the effect of the current coils on the cores is neutralized by the current flowing in the potential coils 17 and 18. If a short circuit or ground occurs on one of the transmission lines energy is supplied to that line from the bus bar, the relation of the currents in the two coils changes, and the two coils coöperate to move the armature of the reverse current relays.

It has been found in practice that the reverse current relays of the type above described often fail to discriminate between a short circuit and reverse energy flow, and unless some provision is made to overcome this defect, the two relays shown in Fig. 1 are apt to trip at the same time, particularly on a short circuit on one of the transmission lines, since each relay can only be adjusted to trip when there is sufficient magnetizing force to set the core in motion. If the core is once started, it keeps on moving until it reaches operative position, because the force of attraction increases as the core enters the coils of the solenoid. The number of turns of the voltage coil must be made so small that with normal voltage and no current in the current coil the core is not raised and consequently currents which are often met with as a result of damage to a transmission line will energize the current coil to such an extent that it will overpower the voltage coil and raise the core, particularly if the current in the voltage coil decreases on account of a drop in voltage, or is out of phase with the current in the current coil.

The difficulty above noted is overcome in my invention by flexibly or resiliently interlocking the cores 20 and 21 of the relays by means of a flexible cord or wire 24, which passes through guide pulleys 25 and over a tension pulley 26 carried upon a movable frame 27 and controlled by a tensioning device such as a spiral spring 28, which engages the frame 27 and is carried upon an adjustable step 29, as shown in Fig. 3. The position of the step 29 may be adjusted by means of the thread on one end of a calibrating screw 30 which is reversely threaded at opposite ends, and is carried in suitable brackets, while the calibrating stops 31, which determine the position of the cores in relation to the coils, are controlled by the thread at the other end of the screw, hence rotation of the screw causes the step 29 and the stops 31 to move in opposite directions at the same rate of speed. There is preferably considerable lost motion between each core and the short circuiting switch which it operates, so that the core may move through a considerable distance before engaging and operating the switch.

The interlock is so proportioned that when either of the two cores is pulled up, the spring 28 is compressed until finally the frame 27 cannot move downward any farther and is held stationary by the step or projection 29. Both plungers, if attracted at the same time and with equal force, will be accelerated with the same speed and both will reach the same height, until they are stopped by the cord or wire which interlocks them, and neither of the cores is able to reach operative position and actuate its corresponding short circuiting switch. The flexible interlock comprising the core and pulleys is superior to a rigid interlock, since it allows either core to travel free and unhampered by the counterbalancing of the other one, until the spring 28 is entirely compressed, and since the core with the greater magnetic pull can accelerate more quickly than the other one, it reaches operative position first and renders the other core unable to affect its short circuiting switch, since only one core can move into operative position at one time.

When both lines are in operation and a short circuit occurs on one of the feeders, both transmission lines will carry the same heavy current if they are both of the same condition. Even though as a result of the short circuit the voltage of the system drops so much that the current coils overpower the voltage coils of the reverse current relays both cores will be pulled up with equal force but neither can travel far enough to trip either of the switches on account of the interlock above described, and under ordinary conditions, short circuits on the feeders will not usually trip the transmission line and transformer switches. If a short circuit or other derangement occurs on one of the transmission lines the current and potential coils on the relay corresponding to that line coöperates and quickly bring the core of the relay into operative position, cutting out the damaged transmission line and at the same time preventing the other core reaching tripping position, which it tends to do in response to heavy current through the other transmission line.

It is preferable, as shown in Fig. 1, to provide the main switches with auxiliary contacts 32 and 33 arranged to short circuit the current coil of the relay on the opposite line as soon as either main switch opens, since the opening of one transmission line permits the core of the relay corresponding to that line to drop back to normal position and leaves the core of the other relay in position to respond to the heavy current through its current coil caused by a short circuit on one of the feeders, and such a short circuit might therefore shut down the system before the transformers which were cut out on account of trouble on the transmission lines have been put back on the circuit.

It is often desirable to disconnect the transmission lines during operation by very small amounts of reverse current, caused by leakage so slight that it does not seriously affect the line voltage, and in such a case the difference of magnetizing force between the current coil and the potential coil may not be great enough to bring the relay into action. It also happens at times that the voltage of the system drops down and the current in the potential coils lags, especially at heavy short circuits, until the influence of the potential coils is not sufficient for working the relay either way, since the number of turns permissible for the potential coil is limited by the fact that the cores must be unaffected at normal voltage and no current. The disadvantages above noted are obviated in accordance with my invention by means of some auxiliary device which multiplies the effect of the relay coils and energizes them only during the time trouble is present on either transmission line and which keeps the relay coils out of circuit when a short circuit occurs on the feeders. Such an auxiliary relay or device may assume various forms without departing from the spirit of my invention, but one form which may be used is shown diagrammatically in Fig. 4 in which my invention is shown embodied in a substation supplied by two parallel three-phase transmission lines, although obviously the number of phases makes no difference in the principle of operation.

The arrangement shown in Fig. 4 corresponds with that shown in Fig. 1 with the addition of the auxiliary relay, and each transmission line is provided with two current transformers 13 and 13$^a$ and 14 and 14$^a$, which are connected to the tripping coils 12 of the switches, the transformers 13 and 13$^a$ also being connected to the current coils 15—15$^a$, respectively, while the transformers 14 and 14$^a$ are also connected to the current coils 16 and 16$^a$, respectively, of two sets of interlocking relays such as above described and shown in Figs. 2 and 3. The relays having current coils 15 and 16 are therefore connected to corresponding phases on the two transmission lines, and are interlocked, while the other two relays are also connected to corresponding phases and are interlocked. The potential coils of the relays are supplied from potential transformers 19—19$^a$, and since both the current and potential coils are connected into circuit only when the auxiliary device or relay is actuated and are energized for only a few seconds the magnetization can safely be carried to such a point that the difference of magnetic forces of the relay coils is more than sufficient to give a start in the desired direction. An auxiliary device or relay is provided for each transmission line, comprising current coils $13^b$ and $14^b$, energized from the transformers 13 and 14 respectively and current coils $13^c$ and $14^c$ energized from the current transformers $13^a$ and $14^a$ respectively. The current coils of the auxiliary device or relay connected to corresponding phases of the two transmission lines are oppositely wound and are provided with movable cores 34 and 35 which carry at the lower end bridging contacts 36 and 37 for closing the circuit of the potential coils of the relays. When the auxiliary relay is energized the current coil 15 of the relay and current coil $13^b$ of the auxiliary relay are connected in series, but under normal conditions the bridging contact 38 actuated by the core 34 of the auxiliary relay short circuits the current coil 15 and thereby causes the current to flow through the bridging contact 38 instead of through the current coil 15. The connections between the other bridging contacts of the auxiliary relay and the current coils of the relays are similar so that under normal conditions the bridging contact 39 of the auxiliary relay permits current to flow around the current coil 16, bridging contact 40 permits current to flow around the current coil $15^a$ of the relay and bridging contact 41 permits current to flow around current coil $16^a$ of the relay, these current coils being thrown into series with the current coils of the auxiliary relay when the auxiliary relay is energized and the bridging contacts are lifted.

The construction of one element of the auxiliary device is shown in detail in Figs. 5 and 6, in which the current coils $13^b$ and $14^b$ of the left hand side of the auxiliary device shown in Fig. 4 are mounted in an iron casing and arranged to coöperate to move the core 34. The contacts 38, 39, and 50 are made in the form of segments of a disk and coöperate with spring contacts 51 mounted on a plate of insulation 52 on the upper end of the device, the disk being mounted on and insulated from a rod 53 which is lifted through a spring 54 mounted in a cup 55. The rod 53 is connected through a spring 56 to a rod 57 which carries the bridging contact 36. As the core 34 rises it engages the cup 55, compressing the spring 54 and lifting the rod 53 and at the same time through the spring 56 lifting the rod 57, thereby bringing the bridging contact 36 into engagement with the fixed contacts.

Since the current coils of the auxiliary relay or device are oppositely wound and are connected to current transformers on corresponding phases of the two transmission lines, the cores 34 and 35 are unaffected as long as the currents of the two transmission lines are in phase. If a short circuit or bad leak occurs on one of the transmission lines the currents are no longer in phase and the two current coils of the corresponding auxiliary device or relay coöperate to raise the core, thereby closing the circuit through the potential coils and simultaneously opening the short circuit around the current coils of the interlocked relays, whereupon heavy currents flow through both the current coils and potential coils of the interlocked relays and cause one or the other of the relays to operate quickly and definitely. As the relay cores are lifted the corresponding short circuiting switches 22, $22^a$, and 23, $23^a$ are operated, opening the short circuit through the trip coils 12 and permitting the full current from the current transformers to flow through the trip coils and open the switches. As soon, for instance, as the automatic switch or circuit breaker 7 opens the current coils $14^b$ and $14^c$ of the auxiliary relay or device are short circuited by means of the short circuiting switches 42 and 43, while the opening of the switch 8 short circuits the current coils $13^b$ and $13^c$ through the short circuiting switches 44 and 45. Since the opening of the switch 7, for example, cuts off current from the coil $13^b$ by opening the transmission line and thereby depriving the current transformer 13 of current and at the same time short circuits the coil $14^b$ fed from the transformer 14 in the other transmission line, the core of the auxiliary relay drops as soon as the switch 7 opens and the reverse current relay coils are cut out of circuit.

The bus sectionalizing switch 46 is prevented from opening automatically by any suitable arrangement which is controlled by the auxiliary relay and in any suitable way renders the sectionalizing switch non-automatic during the time the auxiliary relay is energized. In the specific arrangement shown, the switch 46 is provided with a trip coil 47, controlled by short circuiting relays 48, each relay being provided, as shown in the figure, with opposed windings supplied with current from the current transformers 49 in the busses. Under normal conditions one of the windings is short circuited by the short circuiting switches 50 mounted on the upper end of the cores of the auxiliary devices or relays, and the sectionalizing switch will therefore open automatically under overload, since the section of the coil which is not short circuited will operate to lift the core of the relay in case of an excessive current in the bus, but as soon as the auxiliary relay operates and one of the switches 50 is opened the short circuit on the other part of the relay winding is removed, the two windings counteract each other and the sectionalizing switch is non-automatic until the auxiliary relay or device again assumes the normal position shown in the drawing.

My invention may be embodied in many other forms than that shown and described, and I therefore do not wish to be restricted to the specific arrangement disclosed but intend to cover by the appended claims all changes and modifications within the spirit and scope of my invention.

What I claim as new and desire to secure by Letters Patent of the United States, is,—

1. In a protective device, the combination with a plurality of tripping relays having members movable into tripping position in response to abnormal conditions, of a flexible connection between said members whereby the movement of one member into tripping position holds the other members inoperative.

2. In a protective device, the combination with a plurality of tripping relays having members movable into tripping position in response to abnormal conditions, of a resilient interlock between said members arranged to prevent more than one of said members reaching tripping position simultaneously.

3. In a protective device, the combination with a plurality of tripping relays having members movable into tripping position in response to abnormal conditions, of an interlock between said members, and yielding means connected to said interlock to hold said members in inoperative position.

4. In a protective device, the combination with a plurality of tripping relays having members movable into tripping position in response to abnormal conditions, of a flexible interlock connected to said members and of a length to permit only one member at a time to reach tripping position, and a spring arranged to exert a strain on said interlock to hold said members in position.

5. In a system of distribution, the combination with two parallel transmission lines connected to a common bus bar, of reverse current relays connected to corresponding phases of said lines, and an interlock between said relays arranged to permit only one relay at a time to reach operative position, thereby disconnecting the line controlled by said relay and simultaneously rendering the other relay inoperative.

6. In a system of distribution, the combination with two parallel transmission lines connected to a common bus bar, of a reverse current relay for each line comprising current and potential coils connected to said lines, an interlock between said relays arranged to permit only one relay at a time to reach operative position, and means actuated when said relay reaches operative position to short circuit the current coil of the other relay.

7. In a system of distribution, the combination with a plurality of polyphase transmission lines connected to a common bus bar, of a reverse current relay for each line arranged to disconnect each line from the bus bars when actuated, each relay having a current coil connected to corresponding phases of said lines, and a yielding interlock between said relays which permits only one of said relays to become operative at any instant, whereby only that relay which corresponds to a damaged transmission line is actuated.

8. In a system of distribution, the combination with two parallel transmission lines connected to a common bus bar, of reverse current relays each comprising current and potential coils coöperating on a common armature, the current coils of said relays being connected to corresponding phases of said transmission lines, and a flexible interlock between said armatures arranged to permit only one armature at a time to reach operative position.

9. In a system of distribution, the combination with a plurality of parallel polyphase transmission lines connected to a common bus bar, of a reverse current relay for each line arranged to disconnect said line from the bus bar, each of said relays comprising a current coil and potential coil coöperating on a common core, and a flexible member connected to said cores to cause the operation of one relay to prevent the operation of the others, whereby only the damaged transmission line is disconnected from the bus bar.

10. In a system of distribution, the combination of parallel polyphase transmission lines connected to a common bus bar, of a reverse current relay for each line comprising current and potential coils and a movable core common to said coils, the current coils of said relays being connected to corresponding phases of said transmission lines, and flexible connections between said cores arranged to permit any one core to reach operative position and simultaneously to hold all the other cores in inoperative position.

11. In a system of distribution, the combination with parallel transmission lines connected to a common bus bar, of a normally inoperative protective device responsive to reverse energy flow in any of said lines to disconnect said line from said bus bar, and means actuated in response to abnormal conditions of said transmission lines to render said protective device operative.

12. In a system of distribution, the combination with parallel transmission lines connected to a common bus bar, of a protective device for disconnecting either of said lines, said device being responsive to reverse energy flow and normally disconnected from said lines, and means actuated in response to abnormal conditions of said lines to connect said device therewith.

13. In a system of distribution, the combination with parallel transmission lines connected to a common bus bar, and reverse current relays for said lines comprising current and potential coils coöperating on a common armature, of an auxiliary relay responsive to abnormal conditions on said lines and arranged to connect said coils of said relays to said transmission lines.

14. In a system of distribution, the combination with two parallel transmission lines connected to a common bus bar, of a normally inoperative protective device for each line responsive to reverse energy flow in said line, an auxiliary relay comprising opposed current coils connected to corresponding phases of said transmission lines, said relay being arranged to render operative any protective device when the transmission line controlled thereby is damaged, and means controlled by said protective device for rendering ineffective that relay current coil which is connected to the sound transmission line.

15. In a system of distribution, the combination with an automatic switch arranged to be opened by abnormal current, of a second switch in series therewith, tripping mechanism actuated by reverse energy flow to open said second switch, and means controlled by said tripping mechanism for rendering said first switch non-automatic.

16. In a system of distribution, the combination with a sectionalized bus bar and an automatic switch between sections of said bus bar responsive to abnormal current between said sections, of a transmission line connected to said bus bar through a second switch, tripping mechanism responsive to abnormal conditions on said line to open said second switch, and means controlled by said tripping mechanism for rendering said first switch non-automatic.

17. A protective device comprising two tripping relays having members movable into tripping position in response to abnormal conditions, and a mechanical connection between said members which permits said members to move independently of each other when in normal position and whereby either member is mechanically held in normal position when the other member is in tripping position.

18. A protective device comprising two tripping relays having members movable into tripping position in response to abnormal conditions, and a mechanical interlock which forms a lost motion connection between said members to permit independent movement thereof when said members are in normal position and through which either member when in tripping position holds the other member stationary.

In witness whereof, I have hereunto set my hand this 27th day of August, 1908.

RUDOLF M. OSTERMANN.

Witnesses:
C. G. WALKER,
FREDERICK HEUERA.

Copies of this patent may be obtained for five cents each, by addressing the "Commissioner of Patents, Washington, D. C."